United States Patent [19]

deNora et al.

[11] E Patent Number: Re. 32,077

[45] Reissued Date of Patent: Feb. 4, 1986

[54] ELECTROLYTIC CELL WITH MEMBRANE AND METHOD OF OPERATION

[75] Inventors: Oronzio deNora, Milan; Alberto Pellegri, Luino, both of Italy

[73] Assignee: Oronzio deNora Impianti Elettrochimici S.p.A., Milan, Italy

[21] Appl. No.: 308,028

[22] Filed: Oct. 2, 1981

Related U.S. Patent Documents

Reissue of:

[64] Patent No.: 4,177,116
Issued: Dec. 4, 1979
Appl. No.: 910,494
Filed: May 30, 1978

U.S. Applications:

[63] Continuation-in-part of Ser. No. 864,855, Dec. 27, 1977, abandoned.

[51] Int. Cl.[4] ..... C25B 1/46; C25B 9/00

[52] U.S. Cl. ..... 204/98; 204/128; 204/260; 204/263; 204/266; 204/283

[58] Field of Search ..... 204/260, 283, 263, 266, 204/98, 128

[56] References Cited

U.S. PATENT DOCUMENTS

| | | | |
|---|---|---|---|
| 673,453 | 5/1901 | Roberts | 204/260 |
| 3,853,735 | 12/1974 | Shepard et al. | 204/260 |
| 3,891,532 | 6/1975 | Jensen et al. | 204/260 |
| 3,945,892 | 3/1976 | James et al. | 204/1 R |
| 3,969,201 | 7/1976 | Oloman et al. | 204/83 |
| 4,006,067 | 2/1977 | Gussack | 204/151 |
| 4,035,254 | 7/1977 | Gritzner | 204/98 |
| 4,105,514 | 8/1978 | Justice et al. | 204/98 |
| 4,124,477 | 11/1978 | Tokawa et al. | 204/252 |
| 4,276,130 | 6/1981 | Seko et al. | 204/98 |

*Primary Examiner*—R. L. Andrews
*Attorney, Agent, or Firm*—Bierman, Peroff & Muserlian

[57] ABSTRACT

Describes electrolytic cell with dimensionally stable anodes, non-porous ion-selective membranes separating said anodes from the cathode compartment, and a porous, static bed of loose, conducting cathodic material in the cathode compartment, extending between the conductive walls of the cathode compartment and the membrane and contacting the conductive walls of the cathode and said membranes to carry current between the walls of the cathode compartment and said membranes. This construction reduces the electrodic gap to substantially the thickness of the membranes and presses the membranes against the anodes. It produces greater uniformity of current density over the entire electrodic area, substantially free from localized differences of current density which tend to cause deterioration of membranes by the creation of localized mechanical and electrical stresses in other types of cells, and provides a method for carrying current from the effective cathodic surface to the walls of the cathode compartment.

24 Claims, 2 Drawing Figures

ELECTROLYTIC CELL WITH MEMBRANE AND METHOD OF OPERATION

Figure 1:
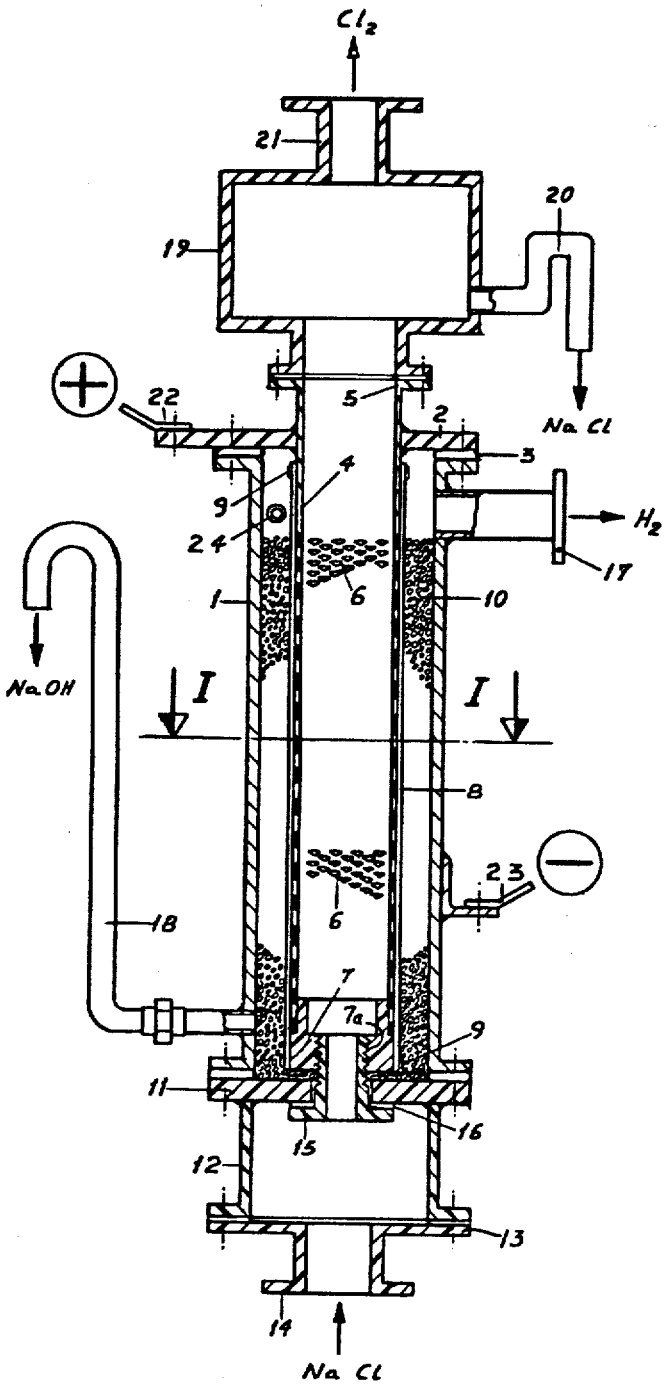

Matter enclosed in heavy brackets [ ] appears in the original patent but forms no part of this reissue specification; matter printed in italics indicates the additions made by reissue.

PRIOR APPLICATION

This application is a continuation-in-part of our copending, commonly assigned U.S. patent application Ser. No. 864,855 filed Dec. 27, 1977; now abandoned.

This invention concerns, generally, an electrolytic cell with anodes covered by an ion-selective membrane wherein the cathode is formed by a static, porous bed of small conducting particles, extending between the walls of the cathode compartment and the walls of the membranes and pressing said membranes against the anodes. In particular, the invention relates to a cell for the electrolysis of aqueous solution of alkali metal halides, although it may be used for carrying out other electrolysis reactions, such as the electrolysis of other salts which undergo decomposition under electrolysis conditions, for the electrolysis of HCl solutions, the electrolysis of water, organic and inorganic oxidations and reductions, etc.

Recently, electrolytic cells have been developed which use ion exchange membranes instead of the more tradional asbestos diaphragms, especially for brine electrolysis. Although they are electrolytically conductive under operating conditions, such membranes are substantially impermeable to the hydrodynamic flow of liquids and gases. In operation, the alkali metal halide brine is introduced into the anodic compartment, where gaseous halogen develops on the surfaces of the anode. The alkali metal ions are selectively transported across the cationic membrane into the cathodic compartment, where the alkali metal ions combine with the hydroxyls generated on the cathode by electrolysis of the water to form alkali metal hydroxide.

Cells with cationic membranes offer numerous advantages over the conventional diaphragm cells. They permit the production of relatively pure solutions of alkali metal hydroxide, not diluted with brine as in the case of the porous diaphragms, where subsequent separation and purfication of the hydroxide is required, and also permit a more efficient and simplified operation of the electrolysis process.

To fully utilize the characteristics of the nonporous membranes, it is desirable to reduce to a minimum the distance between electrodes (i.e., the interelectrodic gap), which reduction has a remarkable effect on the operating voltage and hence on the energy efficiency of the electrolytic process.

Commercial membranes are sensitive to current density, which must be maintained within certain optimal limits for efficient operation of the membrane. The current density should be nearly constant over the entire surface, so as to avoid the occurence of mechanical and electrical stresses, which would irreversibly damage the membrane.

In the known membrane cells, the optimation of these parameters depends to a large extent on the structural tolerance limits and, in view of the size of the electrode surface in the commercial cells, relative to the ever smaller electrode spacings (of the order of some millimeters), the inevitable deviations from the most exact parallelism between the anodic and cathodic surfaces cause more or less marked variations of the current density over the surface of of the membrane. As a result, past efforts to assure a correct current density locally, on various areas of the membrane, have not been successful.

According to a specific embodiment of the present invention, a cationic membrane cell particularly suited for the electrolysis of aqueous solutions of alkali metal halides is provided where the electrode spacing is exceptionally small by comparison with that of the known cells and where the electrode spacing is practically constant over the entire expanse of the electrode surfaces; yet, attaining these characteristics does not impose stringent mechanical tolerances in the cell but, rather, renders the heretofore stringent mechanical tolerances unnecessary.

A further object of the invention is to provide a membrane cell with an exceptionally high ratio between electrode surfaces and overall volume of the cell.

Another object is to maintain conductivity on the cathodic side of the membrane by introducing a controlled amount of moisture into the cathode compartment.

Another object is to control the concentration of the alkali metal hydroxide in the cathode compartment by controlling the amount of moisture introduced into the cathode compartment.

Another object is to provide a method of operating an electrocatalytic cell having ion-selective, cationic membranes between the anodes and cathodes which maintains the current density through said cell substantially constant and reduces mechanical and electrical stresses on the membranes which tend to destroy the membranes.

Another object is to provide a new method of conducting current between the cathodic surfaces adjacent the surface of membrane diaphragms and the walls of the cathode compartment which will provide uniformity, of current distribution in the cathode compartment, which is self-adjusting if current disturbances occur and which maintain a pressure on the diaphragms to keep them in contact with the anode surfaces.

Various other objects and advantages of the invention will become apparent from the description which follows.

The preferred embodiment of the cell of this invention comprises a cathode container of steel or other conductive material resistant to corrosion in the catholyte environment which is closed at the upper end by a plate or cover of titanium or other valve metal, which is passivatable under conditions of anodic polarization and which has at least one but preferably a series of tubular anodes welded into holes in the titanium cover plate which extend almost the entire depth of the container, with the walls of the tubular anodes (except the upper part of the anode walls near the welds to the titanium plate) perforated so as to be permeable to liquids and gases.

The anodes are dimensionally stable and, typically, are of titanium or other valve metal, coated on at least part of the active surface with an electroconducting, electrocatalytic deposit of material resistant to the anodic conditions and not passivatable, preferably a deposit of noble metals such as platinum, palladium, rhodium, ruthenium and iridium, or oxides or mixed oxides thereof. The lower ends of the tubular anodes are closed by plugs of inert, preferably plastic, material provided with coaxial threaded holes. The permeable walls of the tubular anodes are completely covered externally by the membranes so as to delimit the anodic compartment inside the tubular anodes.

The lower end of the cathode container is closed by a plate, preferably of inert plastic material, and is provided with means for feeding brine or other anolyte into the interior of the various tubular anodes, typically by means of inlets of plastic material whose flanges form a seal against the bottom plate of the container. The anolyte is fed through tubular connectors screwed into the threaded holes of the closing plugs of the tubular anodes.

The container in the preferred embodiment is provided with an outlet in the upper part for the emergence of the cathodic gas, with a discharge opening in the lower part for discharge of the catholyte and with an inlet pipe for recycling the dilute catholyte or water into the cathodic compartment. The anodes welded to the cover of the container communicate through the holes in the cover with a chamber above the container where the anodic gas separates from the electrolyte, escapes from an outlet and flows to a gas recovery system and the electrolyte is recycled to a resaturation system before reintroduced into the cell.

The cathode of the cell consists of a porous, static bed of loose, conducting cathodic material in the form of chips, beads, balls, cylinders, Raschig rings, metallic wool or other particles with which the container is completely filled to a height corresponding at least to the height of the permeable walls of the tubular anodes covered by the membranes. The filling of cathodic material is in contact with the inner walls of the container and with the outer surfaces of the membranes on the various tubular anodes and presses against the membranes. The conductive cathodic filling material may be graphite, lead, iron, nickel, cobalt, vanadium, molybdenum, zinc, or alloys thereof, intermetallic compounds, compounds of hydridization, carbidization and nitridization of metals, or other materials having good conductivity and resistance to the cathodic conditions.

Materials exhibiting low hydrogen overpotential such as iron, nickel and alloys thereof are particularly suitable for brine electrolysis. On the contrary, for instances, for the reduction of $Fe^{III}$ to $Fe^{II}$ in an acidic sulfate catholyte solution using an anionic membrane and evolving oxygen on the anode, particulate materials having a high hydrogen overpotential such as lead and lead alloys are preferable. The cathodic filling material may also comprise plastic, ceramic, or other inert, non conductive, material coated with a layer of the electrically conductive and cathodically resistant materials mentioned.

The titanium plate or cover to which the tubular anodes are welded is insulated from the cathodic compartment by an insulating gasket. It is connected to the positive terminal of the current distribution network, and the cathodic compartment is connected to the negative terminal of the distribution network.

The mass of the cathode filling is cathodically polarized and functions as cathode and the porosity of the static bed of cathodic material permits rapid evacuation of the cathodic gas and contributes to protect cathodically the inner walls of the cathode container.

The electrode spacing is reduced to little more than the thickness of the membranes by the local deflection of the electrolytic current flux lines on the geometrically undefined surfaces of the cathode material, represented by the particles of the bed directly adjacent to the surfaces of the membranes, and on the geometrically undefined surfaces of the meshes of the permeable walls of the tubular anodes on which the membranes are applied.

The spacing between the cathodic filling material and the anodes remains substantially constant throughout the electrolysis process.

This configuration of the cell produces excellent uniformity of the current density on the entire electrodic area, without sudden localized differences which would tend to deteriorate the membranes by the creation of mechanical and electrical stresses.

Another advantage of the preferred embodiment of the cell of this invention, which comprises a plurality of tubular anodes, is its compactness, as the ratio between the extent of the electrode surfaces and the volume occupied by the cell is much greater than in prior commercial membrane cells.

The drawings of the preferred embodiment illustrate the anodes as circular tubes in a rectangular container, which is preferred because of the greater uniformity of the current density and lower cost. It will be understood, however, that anodes tubes of other shapes, such as oval, rectangular, hexagonal and other polygonal shapes, may be used and are within the scope of the word "tubes" as used herein and that the cell container can be rectangular, cylindrical or other shapes. A less preferred embodiment of the invention is a cylindrical container housing a single, concentric cylindrical anode; however, according to this embodiment a number of cells are necessary to attain the desired capacity. It will also be understood that while the cell of this invention is described in connection with the production of chlorine, it may be used for electrolytic processes producing other products.

Figure 2:
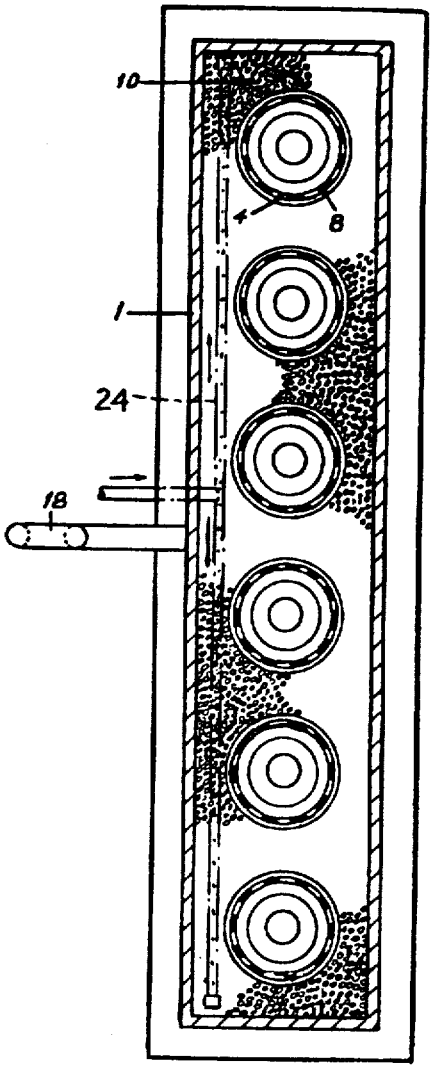

In the accompanying drawings, which illustrate the preferred embodiment of this invention, FIG. 1 is a sectional view and FIG. 2 is a sectional plan view along line 1—1 of FIG. 1, with parts above the section line illustrated in dash lines.

As illustrated in FIG. 1, the cell comprises a rectangular cathodic container 1 of steel or nickel, or alloys thereof, or of other conductive and cathodically resistant metal. A cover 2 of titanium or other anodically passivatable valve metal, bolted to the container 1, closes the container at the top. An insulating gasket 3 is provided between the cathodic container 1 and the titanium cover 2. Tubular anodes 4 of titanium are welded in holes in the cover 2 and extend above the cover as illustrated. The walls of tubular anodes 4 are provided with holes or other perforations, which begin at a short distance below the cover 2 and extend to the bottom of the anodes 4. The perforated portions 6 of the anodes may be formed of reticulated or expanded titanium sheet welded to the imperforate top section 5, or formed integrally therewith. The surface of the perforated portions 6 of the tubular anodes 4 is suitably coated with an electrocatalytic deposit, which is non-passivatable and resistant to anodic conditions, typically containing noble metals or oxides of noble metals. The tubular anodes are closed at the lower end by a plug or closure 7 of titanium welded to the lower end of each anode 4, or, preferably, as indicated in FIG. 1, of chemically resistant plastic material, such as PVC or the like, provided with a coaxial, threaded hole 7a.

The cationic membrane 8, preferably tubular, is slipped over the anodes 4 and fastened to the imperforate top of the anodes and to the outer cylindrical surface of the plug 7 by means of bands of plastic material 9. This fastening is particularly easy and forms a perfect hydraulic seal between the membranes and the perforated sections of the anodes 4 which is difficult to obtain in conventional filter press cells.

The cationic membrane 8 is preferably permeable to cations and impermeable to the hydrodynamic flow of the liquid and gas. Suitable materials for the membranes are fluoridized polymers or copolymers containing sulfonic groups. Such materials are sufficiently flexible and are produced in tubular form by extrusion or hot gluing of flat sheets. The thickness of such membranes is in the order of one-tenth of a millimeter.

The container 1 is turned 180° to facilitate filling and is filled with the cathodic material 10. The container is then closed with a rectangular plate 11 perforated at the base of each of the anodes 4 and, preferably, of inert plastic material. A rectangular brine distribution box 12, also of inert plastic material, is welded to the plate 11 and is closed by a closure plate 13 equipped with a brine inlet opening 14. A gasket may be provided between the plate 11 and the flanged bottom of the rectangular container 1. The flanges of the plate 11 may be bolted to the bottom flange on container 1 and the closure plate 13 may be bolted to the bottom of the distribution box 12. The brine distribution box is connected to the interior of the anodes 4 by means of tubular connectors 15, which are flanged at one end and threaded into the threaded holes 7a of the closure plugs 7. Seals or gaskets 16 are provided between the flanges on the connectors 15 and the brine distribution box 12.

The cathodic compartment is filled with particulate material to about the top of the permeable sections 6 of the tubular anodes 4.

The cathodic container is provided, near the upper part, at a level higher than that of the particulate bed 10, with one or more outlets 17 for hydrogen and, in its lower part, with at least one adjustable gooseneck outlet 18 for discharging the catholyte.

A distribution or spray tube 24, above the level of the particulate material 10, extends horizontally over substantially the entire length of the container 1 and is equipped with a series of holes so as to permit the addition of water or catholyte to the cathodic compartment for diluting and regulating the concentration of the alkali metal hydroxide produced in the cathode compartment.

Preferably, water is continuously added into the cathodic compartment through the distribution tube 24, in order to dilute the hydroxide formed at the cathode and maintain the hydroxide concentration of the catholyte effluent from the cell within 25% and 43% by weight.

Each of the tubular anodes 4 is connected at the top to a rectangular tank 19 extending over the entire top of the cell container 1. The electrolyte level in the tank 19 is maintained constant by a gooseneck discharge tube 20 for the electrolyte. The electrolyte discharged from tube 20 is sent to the resaturation system before being recycled into the cell through the electrolyte inlet 14.

The halogen produced on the anodes separates from the electrolyte in tank 19 and escapes through outlet 21.

The plate or cover 2 to which the tubular anodes 4 are welded is directly connected to the positive terminal of the electric power supply by means of the connection 22 and the cathodic container 1 is connected to the negative terminal by means of connection 23.

FIG. 2 is a sectional view along the line 1—1 of FIG. 1, with the elements of the cell described with reference to FIG. 1 indicated by the same numerals. The location of the distribution tube 24 is indicated by broken lines above the level of the particles of cathodic material 10 in the cathode container 1.

The cell shown comprises six tubular anodes in a rectangular casing, but it will be understood that the number of anodes may be varied in the transverse direction, that more rows of anodes may be used, that the shape of the cell and the anodes may be different from that illustrated and that other modifications and changes may be made within the spirit and scope of our invention.

The extent of the cylindrical surfaces of the tubular anodes 4 is very large relative to the volume of the container 1, which permits high production rates in a compact cell, at substantially equal current density throughout the cell when compared to the cells commonly used commercially. In operation, concentrated brine (120–310 g/ltr) of NaCl, for example, is fed through the inlet 14 into distribution box 12 and rises through each of the tubular anodes 4, on the electrocatalytically coated surfaces of which chlorine forms. The sodium ions traverse the cationic membrane and combine with the hydroxyls released at the cathode by electrolysis of the water, forming sodium hydroxide. The chlorine rises through the electrolyte contained inside the tubular anodes 4 and into tank 19, where it separates from the liquid and escapes through the outlet 21. The rising chlorine bubbles provide a rapid upward flow of the electrolyte in the tubes 4.

The impoverished brine flows through the constant level outlet 20 and is recycled to the resaturation system before being reintroduced into the cell through the inlet 14.

The hydrogen released on the surfaces of the porous cathode bed adjacent the membrane 8 rises through the particle bed 10 and collects in the upper space of the cathodic container, whence it escapes through the outlet 17. The sodium hydroxide solution is discharged through the adjustable gooseneck 18. The adjustable gooseneck 18 maintains the level of the catholyte at substantially the same level as the top of the cathodic bed 10.

The catholyte may be cycled through a recovery system for the sodium hydroxide located outside the cell and the effluent, dilute sodium hydroxide solution, reintroduced into the cathodic compartment through the distribution tube 24.

The operating temperature may vary between 30° and 100° C. and is preferably maintained at about 85° C. The pH of the anolyte may vary between 1 and 6 and the current density may be between 1000 and 5000 $A/m^2$.

While the cell and method of this invention have been described with reference to the illustrative drawings, it is understood that numerous changes and alternatives may be used within the scope of this invention, that other electrolysis processes may be carried out in the apparatus described, that instead of titanium, other valve metals such as tatalum, zirconium, molybdenum, niobium, tungsten and yttrium may be used in the construction of the cell and that the static, conductive, particulate mterial may be used in other forms of electrolysis cells.

We claim:

1. An electrolysis cell comprising an anode compartment containing an electrolyte permeable anode and a cathode compartment containing a cathode separated by an ion exchange membrane supported on the electrolyte permeable anode, means to impress an electrolysis current on the cell, means for introducing anolyte to the anode compartment, means to introducing catholyte to the cathode compartment, means for removing spent anolyte and electrolysis products from the anode compartment and means for removing spent catholyte and electrolysis products from the cathode compartment, the cathode being a static bed of electrically conductive catholyte-resistant [particulate] *filling* material filling the cathode comprtment whereby the membrane is pressed against the anode.

2. An electrolytic cell comprising a container of cathodically resistant metal, a valve metal top on said container electrically insulated from said container, at least one tubular valve metal anode connected to and extending from said top substantially to the bottom of said container, perforations through a portion of the walls of said anode inside said container and an imperforate portion of said anode extending from just below the top of said container to said valve metal top, said anode being open at both ends, an ion permeable membrane on the perforated walls of said anode, a porous, static bed of electrically conductive [particulate] *filling* cathodic material between said membrane and the walls of said container, openings into the tubular anode through the bottom of said container, means to feed electrolyte into the bottom of said tubular anode, means to electrically insulate said anode at the top and bottom from said container, means to convey positive electric current to said anode, means to convey negative electric current from said container, means to conduct gaseous products produced on said anode and electrolyte out of said container, means to conduct gaseous cathodic products produced in said container out of said container, means to introduce liquid into the cathodic compartment of said container between said membrane and the walls of said container and means to convey liquid cathodic products out of said container.

3. The cell of claim 2 in which a plurality of anodes are connected to said valve metal top and extend substantially to the bottom of said container.

4. The cell of claim 2 in which an electrolyte tank, above said container, receives gaseous anodic products and electrolyte from said anodes, means to discharge the gaseous products from said tank and means to maintain the electrolyte level in said tank and to discharge electrolyte above said level from said tank.

5. The cell of claim 2 in which said membranes are fastened to the tops and bottoms of said anodes by bands of plastic material.

6. The cell of claim 3 in which the porous, static bed of [particulate] *filling* material in said container is from the group consisting of graphite, lead, iron, nickel, cobalt, vanadium, molybdenum, zinc, and alloys thereof, intermetallic compounds and compounds of hydridization, carbidization and nitridization of metals.

7. Method for the production of halogen and a hydroxide of an alkali metal by electrolysis of an aqueous solution of the respective alkali metal halide in the cell of claim 2.

8. An electrolysis cell comprising a cathodic container, a valve metal cover for said container, a plurality of tubular valve metal anodes with walls permeable to liquids inside said container and secured to the cover of said container, tubular ion exchange membranes on the outer surfaces of said tubular anodes delimiting and hydraulically separating the cathodic compartment inside said container from the anodic compartment inside said tubular anodes, a bottom closure for said container, means in said closure forming hydraulic connection between the interior of said tubular anodes and an electrolyte distributor external to the cathodic container, a static, porous bed of [particles of conductive] *conductive filling* material resistant to the cathodic conditions in said cathodic container to a height just below the cover of the container, pressing said membranes against said anodes, said static, porous bed being in electrical contact with the inner walls of the cathodic container and functioning as the cathode at the surface adjacent to said membranes, a tank for receiving impoverished electrolyte and anodic gas connected with the upper ends of said tubular anodes, means for passing electrolysis current between said anodes and the cathode of the cell and means for recovering gaseous and liquid products from the cathodic compartment.

9. The cell of claim 8 in which the tubular membranes are permeable to the cations and impermeable to the hydraulic flow of gases and liquids.

10. The cell of claim 9 in which the membrane comprises a fluoridized polymer or copolymer having sulfonic groups.

11. The cell of claim 8 in which the tubular anodes are formed of valve metal coated with an electrocatalytic deposit.

12. The cell of claim 8 in which the inner walls of the cathodic container consist of a material from the group containing iron, nickel and alloys thereof.

13. The cell of claim 8 in which said static, porous bed of a [fragmented] *filling* material from the group of graphite, lead, iron, nickel, cobalt, vanadium, molybdenum, zinc and alloys thereof, and compounds of hydridization, carbidization and nitridization of said materials, extends between the walls of said cathodic container and the membranes on the outer surfaces of said anodes.

14. The cell of claim 13 in which the static, porous bed [comprises fragments in the form of] *consists of* balls, beads, saddles, Raschig rings, cylinders, chips and metal wool.

15. The method of reducing the interelectrode gap in an electrolysis cell having an anode compartment, a cathode compartment, an anode in the anode compartment and a cathode in the cathode compartment, an ion exchange membrane between the anode and the cathode compartment and means to pass an electrolysis current through said cell, which comprises pressing said membrane against said anode by a static bed of *electrically* conducting [particulate] *filling* material between the walls of said cathode compartment and said membrane and conducting electric current through said anode, said membrane and said [particulate] *filling* material between said membrane and the walls of said cathode compartment.

16. In an *improved method of electrolysis of an electrolyte in an* electrolysis cell having an anode compartment and a cathode compartment, electrodes comprising an anode and a cathode, means to pass an electrolysis current between said anode and said cathode and an ion exchange membrane between said electrodes, [method of] *improvement comprising* reducing the interelectrodic gap to approximately the thickness of said membrane[, which comprises] *by* placing said membrane against one of said electrodes, pressing said membrane against said [electrode] *anode* by a *porous* static bed of *electrically* conducting [particulate] *cathodic filling* material between said membrane and the other electrode, and passing the electrolysis current between said electrodes [through said static bed].

17. In *an improved method of electrolysis of an electrolyte in an* electrolytic cell having electrocatalytically coated valve metal anodes, [a cathode] *cathodes* and ion selective cationic membranes substantially impermeable to the flow of liquids and gases therethrough, between the anodes and cathodes, the [method of] *improvement comprising* maintaining the current density substantially constant and [of] reducing mechanical and electrical stresses on said membranes [which comprises] *by* applying said membranes on said anodes, substantially filling the space between the membranes and the electrically conducting walls of the cathodes with loose, porous cathodic filling material in the form of chips, balls, beads, cylinders, Raschig rings, metallic wool or other particles *thereby* pressing said membranes against said anodes, passing an electrolysis current from said anodes through said membranes and said filling material [to the electrically conducting walls of said cathodes] and collecting the anodic gases and liquids separate from the cathodic gases and liquids.

18. The method of claim 17 in which the cathodic filling material is from the group consisting of graphite, lead, iron, nickel, cobalt, vanadium, molybdenum, zinc, and alloys thereof, intermetallic compounds, and compounds of hydridization, carbidization and nitridization of metals.

*19. In a method of producing halogen and alkali metal hydroxide by electrolysis of an aqueous alkali metal halide solution in a cell having an anode compartment and a cathode compartment, an anode permeable to both gas and electrolyte in the anode compartment, a porous cathode permeable to both gas and electrolyte in the cathode compartment, an ion-exchange membrane substantially impervious to hydrodynamic flow separating the anode compartment from the cathode compartment, means to pass alkali metal halide solution through said anode compartment, means to provide water to the cathode compartment, means to pass an electrolysis current through said cell and means to recover the anodic and cathodic electrolysis products, the improvement comprising maintaining the said membrane compressed between the said anode and said porous cathode, the said cathode comprising a cathodically polarized bed of electrically conductive, catholyte resistant, porous filling material in contact with the cathodic surface of the membrane and pressing the membrane against the anode.*

*20. A method of generating chlorine comprising electrolyzing an aqueous chloride in a cell having an upright ion-exchange membrane with an anode and a cathode in contact with opposite sides of the membrane, said cathode comprising an open, static bed of electrically conductive material pressing against the membrane to provide substantially constant and minimum spacing between the anode and cathode.*

*21. The method of claim 20 wherein the spacing does not substantially exceed the thickness of the membrane.*

*22. The method of claim 20 wherein the said bed is open enough to permit evolved hydrogen gas to rise through the bed.*

*23. In a method of electrolysis of alkali metal chloride using a cation exchange membrane, the improvement which comprises positioning the cation exchange membrane intermediate the electrolyte permeable anode and cathode in such a way that the respective surfaces of both the anode and the cathode are in intimate contact with the cation exchange membrane.*

*24. The method of claim 23 wherein the electrolytic cell is a diaphragm cell which is equipped with at least one delpleted brine removing outlet in the anode compartment and at least one water adding line in the cathode compartment.*

* * * * *

UNITED STATES PATENT AND TRADEMARK OFFICE

CERTIFICATE OF CORRECTION

PATENT NO. : RE 32,077

DATED : Feb, 4, 1986

INVENTOR(S) : ORONZIO deNORA and ALBERTO PELLEGRI

It is certified that error appears in the above-identified patent and that said Letters Patent is hereby corrected as shown below: Title page:

[30] Left Out under Priority

--June 30, 1977 Italy 25251A/77 --

Signed and Sealed this

*Third* Day of *June 1986*

[SEAL]

*Attest:*

DONALD J. QUIGG

*Attesting Officer*

*Commissioner of Patents and Trademarks*